(12) United States Patent
Kim et al.

(10) Patent No.: US 7,420,946 B2
(45) Date of Patent: Sep. 2, 2008

(54) APPARATUS AND METHOD FOR INDICATING A BASE STATION IN A MOBILE STATION PROVIDED IN A CDMA COMMUNICATION SYSTEM

(75) Inventors: Soon-Jin Kim, Kumi-shi (KR); Hyun-Il Cho, Kumi-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 977 days.

(21) Appl. No.: 10/425,665

(22) Filed: Apr. 30, 2003

(65) Prior Publication Data

US 2003/0214924 A1 Nov. 20, 2003

(30) Foreign Application Priority Data

May 15, 2002 (KR) ................ 2002-26893

(51) Int. Cl.
*H04B 7/216* (2006.01)
(52) U.S. Cl. .............. 370/335; 370/318; 370/320; 370/331; 370/342; 370/441; 455/566
(58) Field of Classification Search ......... 370/318, 370/320, 331, 332, 333, 335, 342, 441; 455/566
See application file for complete search history.

(56) References Cited

U.S. PATENT DOCUMENTS

| | | | | |
|---|---|---|---|---|
| 5,675,629 A | * | 10/1997 | Raffel et al. | 455/552.1 |
| 5,889,815 A | * | 3/1999 | Iwakiri | 375/148 |
| 5,920,549 A | * | 7/1999 | Bruckert et al. | 370/331 |
| 5,940,452 A | * | 8/1999 | Rich | 375/347 |
| 6,132,391 A | * | 10/2000 | Onari et al. | 600/595 |
| 6,198,942 B1 | * | 3/2001 | Hayashi et al. | 455/552.1 |
| 6,564,070 B1 | * | 5/2003 | Nagamine et al. | 455/556.1 |
| 6,859,446 B1 | * | 2/2005 | Gopalakrishnan et al. | 370/335 |
| 2002/0045465 A1 | * | 4/2002 | Kishida et al. | 455/566 |
| 2003/0036379 A1 | * | 2/2003 | Nikolai et al. | 455/414 |
| 2004/0013246 A1 | * | 1/2004 | Back et al. | 379/88.17 |
| 2004/0142699 A1 | * | 7/2004 | Jollota et al. | 455/452.2 |
| 2004/0202651 A1 | * | 10/2004 | Cohen et al. | 424/131.1 |
| 2004/0203720 A1 | * | 10/2004 | Shih et al. | 455/423 |
| 2005/0181822 A1 | * | 8/2005 | Sasaki et al. | 455/552.1 |

FOREIGN PATENT DOCUMENTS

| | | |
|---|---|---|
| JP | 08-223105 | 8/1995 |
| JP | 2000-201396 | 7/2000 |
| KR | 1020030035163 A | 5/2003 |

* cited by examiner

*Primary Examiner*—Edan Orgad
*Assistant Examiner*—Andrew C Lee
(74) *Attorney, Agent, or Firm*—Roylance, Abrams, Berdo & Goodman, LLP

(57) ABSTRACT

A receiver provided in a mobile station communicating with at least two different types of base stations. In the receiver of the mobile station, a controller generates frequency channel control data for base stations at base station search times, analyzes signals received from the base stations through set frequency channels, and registers the base stations. A radio frequency (RF) module sets reception RF bands in response to the generated frequency channel control data, and down-converts signals received in the set reception RF bands. A searcher measures intensities of signals output from the RF module, and outputs a result of the measurement to the controller. A display unit indicates the base stations registered by the controller.

15 Claims, 12 Drawing Sheets

APPARATUS AND METHOD FOR INDICATING A BASE STATION IN A MOBILE STATION PROVIDED IN A CDMA COMMUNICATION SYSTEM

PRIORITY

This application claims priority under 35 U.S.C. § 119 to an application entitled "APPARATUS AND METHOD FOR INDICATING BASE STATION IN MOBILE STATION PROVIDED IN CDMA COMMUNICATION SYSTEM", filed in the Korean Industrial Property Office on May 15, 2002 and assigned Ser. No. 2002-26893, the contents of which are incorporated herein by reference.

BACKGROUND OF THE INVENTION

1. Field of the Invention

The present invention relates to a receiver provided in a mobile station and a method thereof, and more particularly to an apparatus and method for allowing a mobile station to identify and indicate types of base stations.

2. Description of the Related Art

A mobile communication system based on a code division multiple access (CDMA) system has developed from a voice communication system based on a conventional mobile communication standard into a voice and high-speed data communication system based on an international mobile telecommunication-2000 (IMT-2000) standard. The IMT-2000 system can provide communication services for high-quality voice, moving pictures and Internet searches. In the CDMA mobile communication system, communication links are classified into a forward link directed to a mobile station from a base station and a reverse link directed to a base station from a mobile station.

The conventional CDMA mobile communication system can provide a voice communication service, but cannot appropriately provide a data communication service requiring a high-speed transmission rate and high speech quality.

To provide various multimedia data services such as data communications containing packet data communications other than voice communications, high-quality voice communications, etc., the CDMA mobile communication system must include service channels for providing voice and data communications, and dynamically assign a channel according to a user's request. In this case, a base station subsystem must be able to support voice and data communication services. Here, the base station subsystem is referred to as a CDMA 1X base station subsystem.

Moreover, research for providing a CDMA mobile communication system (hereinafter, referred to as a "CDMA system") capable of transmitting high-speed data has recently been conducted. A representative communication system having a channel structure for transmitting high-speed data is a high data rate (HDR) system. The HDR system is a mobile communication system for a standard of an HDR system proposed in $3^{rd}$ generation partnership project 2 (3GPP2) to improve a data communication service provided by an IS-2000 system.

The HDR system uses link adaptation techniques for changing a coding rate and a modulation scheme according to a channel state, and adjusting a data transmission rate. In the forward link of the HDR system, a pilot channel, a forward media access control (MAC) channel, a forward traffic channel and a forward control channel are transmitted after time division multiplexing (TDM) is applied. The forward traffic channel using the link adaptation techniques can implement a transmission operation on the basis of three modulation schemes such as quadrature phase shift keying (QPSK), 8-ary phase shift keying (8PSK) and 16-ary quadrature amplitude modulation (16QAM), three coding rates such as ¼, ⅜ and ½ coding rates, and data transmission rates according to thirteen transmission methods based on a combination of slots in which packets are repeatedly transmitted. In this case, a base station subsystem for supporting only a data communication service is referred to as a CDMA 1X evolution data only (EVDO) base station subsystem.

Where different types of base station subsystems are used, the user must hold different mobile stations according to the different base station subsystems. That is, channel structures are different according to the type of base stations. The mobile station is independently used according to the types of the base stations. An IMT-2000 CDMA system is based on a CDMA standard for North America and a universal mobile telecommunications system (UMTS) standard for Europe.

Mobile stations capable of communicating with the CDMA 1X base station subsystem and the EVDO base station subsystem have been developed. In the future, when full-scaled CDMA communication services are provided, the mobile stations capable of communicating with a CDMA base station subsystem based on a North American standard and a UTMS base station subsystem based on a European standard will be developed. Where a mobile station capable of communicating with at least two different types of base station subsystems is used, the user must be able to identify the type of the base station subsystem to be communicated with in a place where the mobile station is currently located.

SUMMARY OF THE INVENTION

It is one object of the present invention to provide a receiver in a mobile station and a method thereof, which can analyze channel signals transmitted from at least two different types of bases station subsystems and discriminate between the base station subsystems in a code division multiple access (CDMA) communication system.

It is another object of the present invention to provide a receiver in a mobile station and a method thereof, which can discriminate between and indicate a base station subsystem in a code division multiple access (CDMA) communication system for providing voice and data communication services, and a base station subsystem provided in a CDMA communication system for providing only a data communication service.

It is yet another object of the present invention to provide a receiver in a mobile station and a method thereof, which can discriminate between and indicate base stations using the same spread code sequences and different frequency bands.

In accordance with one aspect of the present invention, the above and other objects can be substantially accomplished by the provision of a receiver provided in a mobile station communicating with at least two different types of base stations, comprising: a controller for generating frequency channel control data for base stations at base station search times, analyzing signals received from the base stations through set frequency channels, and registering the base stations; a radio frequency (RF) module for setting reception RF bands in response to the generated frequency channel control data, and down-converting signals received in the set reception RF bands; a searcher for measuring intensities of signals output from the RF module, and outputting a result of the measurement to the controller; and a display unit for indicating the base stations registered by the controller.

In accordance with another aspect of the present invention, there is provided a receiver provided in a mobile station of a code division multiple access (CDMA) communication system communicating with a first base station used for voice and data communication services and a second base station used only for a data communication service, comprising a controller for generating frequency channel control data assigned to the first base station at a first search time, generating frequency channel control data assigned to the second base station at a second search time, analyzing signals received from the base stations through respectively set frequency channels, and registering the base stations; a radio frequency (RF) module for setting reception RF bands in response to the generated frequency channel control data, and down-converting signals received in the set reception RF bands; a first data processor for measuring an intensity of a received signal of the first base station output from the RF module, and outputting a result of the measurement to the controller; a second data processor for measuring an intensity of a received signal of the second base station output from the RF module, and outputting a result of the measurement to the controller; and a display unit for indicating the first base station and/or the second base station registered by the controller.

In accordance with another aspect of the present invention, there is provided a method for identifying base stations in a mobile station communicating with at least two different types of first and second base stations, comprising the steps of outputting first frequency channel control data for selecting the first base station at a first search time, measuring a signal received from a frequency channel, and determining registration of the first base station; outputting second frequency channel control data for selecting the second base station at a second search time after a predetermined time elapses from the first search time, measuring a signal received from a frequency channel, and determining registration of the second base station; and indicating the registration of the first base station and/or the registration of the second base station in response to results of the determinations.

In accordance with another aspect of the present invention, there is provided a method for identifying base stations in a mobile station communicating with at least two different types of first and second base stations, comprising the steps of measuring a signal received from a frequency channel and determining registration of the first base station after outputting first frequency channel control data for selecting the first base station at a search time, and subsequently measuring a signal received from a frequency channel and determining registration of the second base station after outputting second frequency channel control data for selecting the second base station; and indicating the registration of the first base station and/or the registration of the second base station in response to results of the determinations.

In accordance with yet another aspect of the present invention, there is provided a method for identifying base stations in a mobile station communicating with at least two different types of first and second base stations, comprising the steps of outputting first frequency channel control data for selecting the first base station at each search time, measuring a signal received from a frequency channel, and determining registration of the first base station; outputting second frequency channel control data for selecting the second base station at a communication mode, measuring a signal received from a frequency channel, and determining registration of the second base station; and indicating the registration of the first base station and/or the registration of the second base station in response to results of the determinations.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described in detail with reference to the annexed drawings.

Those skilled in the art will appreciate that specific criteria such as types of base stations, a parameter for discriminating the types of the base stations, etc. are described only for illustrative purposes to help in understanding the present invention, and the present invention can be also implemented without the specific things.

It is assumed that a first base station refers to a code division multiple access (CDMA) 1X base station subsystem for supporting voice and data communication services, and a second base station refers to a CDMA 1X evolution data only (EVDO) base station subsystem for supporting only a data communication service. The CDMA 1X base station and the CDMA 1X EVDO base station use the same pseudo noise (PN) sequences and different frequency bands. A plurality of CDMA base stations use the same PN sequences and different frequency bands. Accordingly, in the embodiment of the present invention, an exemplary method for analyzing received signals based on channel frequencies from base stations and discriminating types of the base stations will be described.

Figure 1:
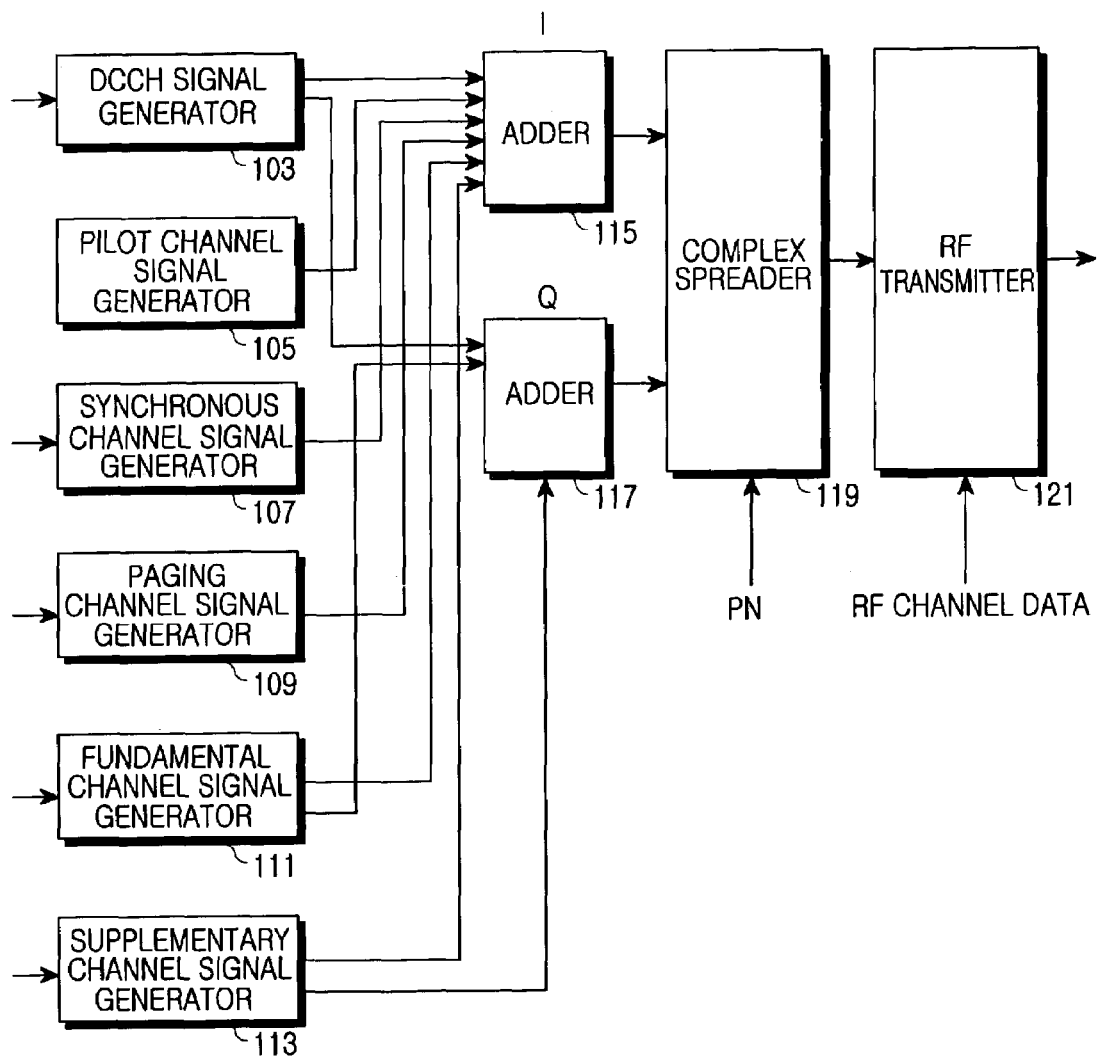
FIG. 1 is a block diagram illustrating an example of a transmission channel base station subsystem provided in a code division multiple access (CDMA) communication system for providing voice and data communication services in accordance with an embodiment of the present invention.

FIG. 1 is a block diagram illustrating an example of a transmission channel base station subsystem provided in a code division multiple access (CDMA) communication system for providing voice and data communication services in accordance with an embodiment of the present invention. Specifically, FIG. 1 depicts a CDMA 1X base station subsystem provided in a CDMA communication system for providing voice and data communication services.

First, a dedicated control channel (DCCH) signal generator 103 is responsible for processing various control messages for transmitting through a DCCH of a forward link and transmitting the processed control messages to a mobile station. In relation to an operation of the DCCH signal generator 103, the messages transmitted through the DCCH of the forward link include various control messages (e.g., for L3signaling) used in a radio link protocol (RLP) frame or IS-95B, a medium access control (MAC) message which refers to a control message associated with the control of a packet data service for assigning and releasing a supplementary channel, etc. Further, where a fundamental channel is not used, a power control signal can be transmitted through the DCCH. In this case, the control message can include the power control signal. Furthermore, in the DCCH of the forward link, a data rate for a base station and the supplementary channel is determined, and a command for changing an orthogonal code is issued when an orthogonal code is used in the supplementary channel.

A pilot channel signal generator 105 is responsible for processing information for transmitting through a pilot channel of the forward link and transmitting the processed information to the mobile station. A pilot channel signal of the forward link always contains logic signals 0's or 1's. Here, it is assumed that the logic signals 0's are output through the pilot channel. The pilot channel signal allows the mobile station to implement a fast initial acquisition operation for new multiple paths and a channel estimation operation. One specified orthogonal code is assigned to the pilot channel and the pilot channel signal is spread.

A synchronous channel signal generator 107 is responsible for processing information for transmitting through a synchronous channel of the forward link and transmitting the processed information to the mobile station. The information transmitted through the synchronous channel allows mobile stations within a single cell to perform initial time synchronization and frame synchronization. One specified Walsh code is assigned to the synchronous channel of the forward link and information of the synchronous channel is spread.

A paging channel signal generator 109 is responsible for processing information for transmitting through a paging channel of the forward link and transmitting the processed information to the mobile station. The information to be transmitted through the paging channel is needed before a traffic channel is established. One of predetermined orthogonal codes is selected and spread.

A fundamental channel signal generator 111 is responsible for processing information for transmitting through a fundamental channel and transmitting the processed information to the mobile station. The information to be transmitted through the fundamental channel of the forward link can include voice signals, the various control messages (e.g., for L3signaling) used in IS-95B and power control signals. In an embodiment of the invention, a signal to be transmitted through the fundamental channel of the forward link can include an RLP frame, a MAC message, etc.

A supplementary channel signal generator 113 is responsible for processing information for transmitting through a supplementary channel of the forward link and transmitting the processed information to the mobile station. The/information to be transmitted through the supplementary channel of the forward link includes an RLP frame, packet data, etc. The supplementary channel signal generator 113 has a data rate of 9.6 kbps or more. The supplementary channel signal generator 113 has a scheduled data rate. The scheduled data rate is negotiated between the base station and the mobile station through the DCCH, and communications are performed on the basis of a data rate designated by the base station. One of orthogonal codes not assigned to the pilot channel signal generator 105, the synchronous channel signal generator 107 and the paging channel signal generator 109, is assigned to the supplementary channel signal generator 113 for the forward link, and a supplementary channel signal is spread and output. Here, the fundamental channel and the supplementary channel are preferably traffic channels.

An adder 115 adds I-channel transmission signals output from the DCCH signal generator 103, the fundamental channel signal generator 111 and the supplementary channel signal generator 113 to transmission signals output from the pilot channel signal generator 105, the synchronous channel signal generator 107 and the paging channel signal generator 109, and outputs an addition signal. An adder 117 adds Q-channel transmission signals output from the DCCH signal generator 103, the fundamental channel signal generator 111 and the supplementary channel signal generator 113, and outputs an addition signal. A complex spreader 119 multiplies the addition signals output from the adders 115 and 117 by a PN spread sequence to perform a spreading operation. A radio frequency (RF) transmitter 121 performs a frequency up-conversion operation for spread signals on the basis of a frequency based on predetermined RF channel data, and transmits a transmission signal.

Figure 2:
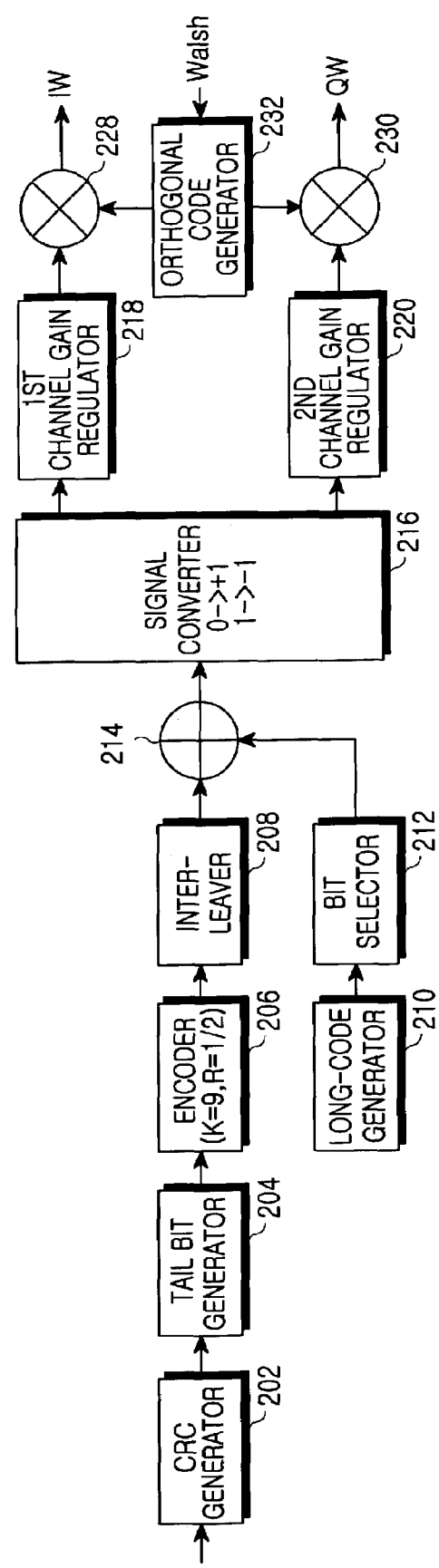
FIG. 2 is a block diagram illustrating an example of a channel signal generator shown in FIG. 1 in accordance with an embodiment of the present invention.

FIG. 2 is a block diagram illustrating an example of a channel signal generator shown in FIG. 1 in accordance with an embodiment of the present invention. FIG. 2 can be a channel structure associated with the DCCH signal generator 103.

Referring to FIG. 2, a cyclic redundancy code (CRC) (additional 16-bit CRC) generator 202 generates a CRC according to a received control frame message, and adds the generated CRC to a received message. A tail bit (e.g., additional 8-bit tail) generator 204 receives an output of the CRC generator 202, generates tail bits for indicating an end of a control message of a frame, adds the tail bits to the frame control message, and outputs the frame control message containing the tail bits.

A channel encoder 206 encodes the frame control message output from the tail bit generator 204, and outputs the encoded frame control message. The encoder 206 can use a convolutional encoder, a turbo encoder and the like An interleaver 208 interleaves symbol data output from the encoder 206, and outputs the interleaved symbol data. Here, the interleaver 208 can use a block interleaver.

A long-code generator 210 generates a long code. Here, the long code is a unique identification code of a subscriber. Long codes can be assigned to different subscribers. A bit selector 212 decimates the long code such that its symbol rate matches a symbol rate of the interleaver 208, and generates a selection signal to determine an insertion position of a control bit signal. An exclusive OR operator 214 performs a logical exclusive OR operation for the interleaved symbol data output from the interleaver 208 and the decimated long code output from the bit selector 212, and then outputs data indicating a result of the logical exclusive OR operation.

A signal converter 216 demultiplexes the data output from the exclusive OR operator 214 such that the data can be transmitted through an I-channel and a Q-channel, and outputs a first channel signal and a second channel signal. Moreover, the signal converter 216 converts a level of symbol data by converting "0" into "+1" and converting "1" into "−1". A first channel gain regulator 218 receives the first channel signal, regulates a gain of the first channel signal in response to a gain control signal, and outputs the regulated first channel signal. A second channel gain regulator 220 receives the second channel signal, regulates a gain of the second channel signal in response to a gain control signal, and outputs the regulated second channel signal.

An orthogonal code generator 232 generates and outputs corresponding orthogonal codes according to an orthogonal code number Wno and an orthogonal code length. Here, the orthogonal codes can be a Walsh code and a quasi-orthogonal code. A multiplier 228 multiplies the first channel signal by an orthogonal code, and then generates an orthogonally modulated first channel signal. A multiplier 230 multiplies the second channel signal by an orthogonal code, and then generates an orthogonally modulated second channel signal.

Figure 3:
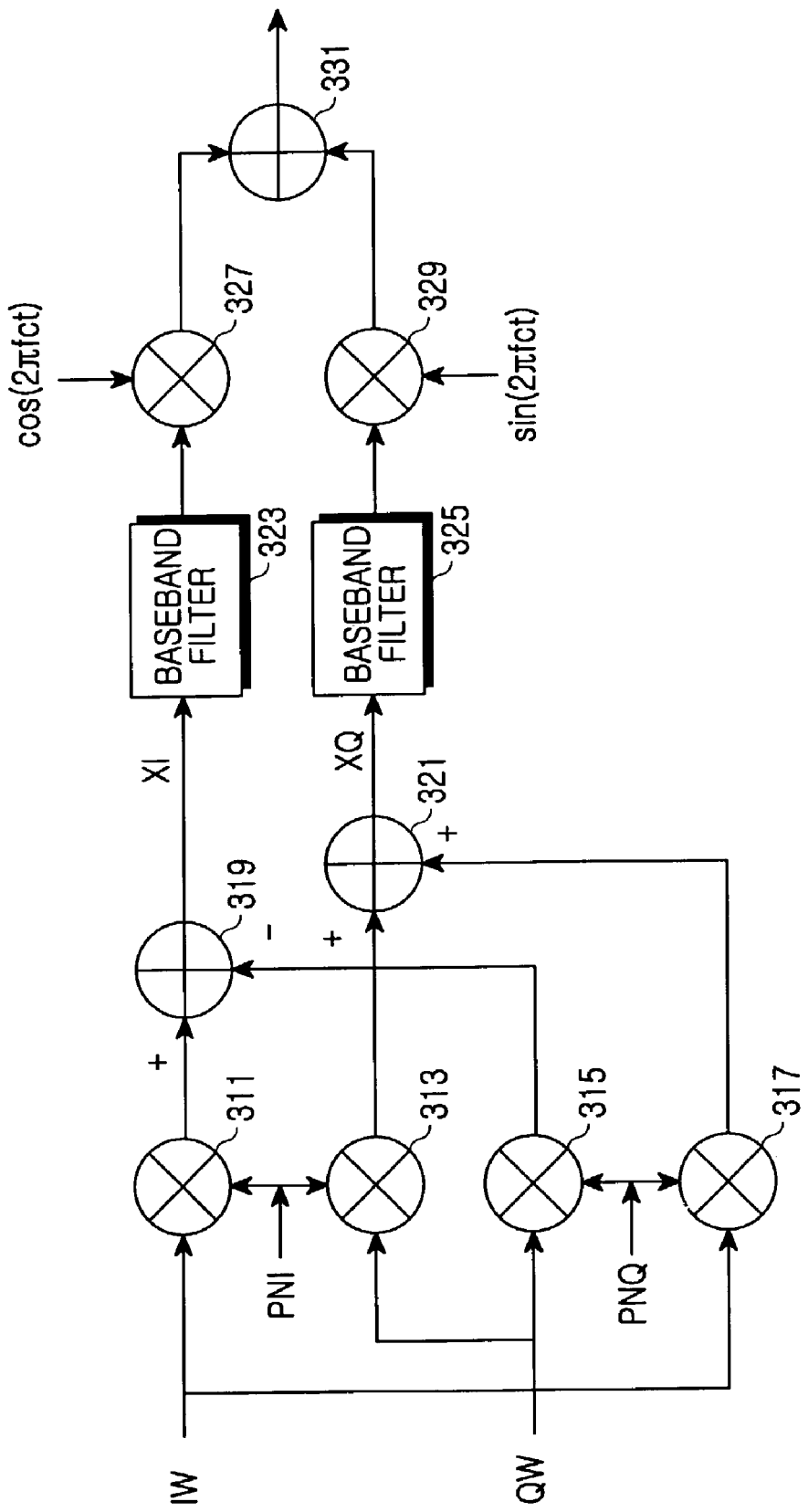
FIG. 3 is a block diagram illustrating an example of a complex spreader and a radio frequency (RF) transmitter shown in FIG. 1 in accordance with an embodiment of the present invention.

FIG. 3 is a block diagram illustrating an example of a channel signal generator shown in FIG. 1 in accordance with an embodiment of the present invention. Specifically, FIG. 3 illustrates the complex spreader 119 for spreading and modulating signals generated from the respective channel generators shown in the FIG. 1 and the RF transmitter 121.

Referring to FIG. 3, a multiplier 311 multiplies an orthogonal modulation signal IW of the I-channel by an I-channel spread sequence PNI. A multiplier 313 multiplies an orthogonal modulation signal QW of the Q-channel by the I-channel spread sequence PNI. A multiplier 315 multiplies the Q-channel orthogonal modulation signal QW by a Q-channel spread sequence PNQ. A multiplier 317 multiplies the I-channel orthogonal modulation signal IW by the Q-channel spread sequence PNQ. A subtracter 319 subtracts an output of the multiplier 315 from an output of the multiplier 311, and then generates an I-channel spread signal XI. An adder 321 adds an output of the multiplier 313 to an output of the multiplier 317, and then generates a Q-channel spread signal XQ. Thus, a difference between the two signals output from the multipliers 311 and 315 is generated as the I-channel spread signal XI. A sum of the two signals output from the multipliers 313 and 317 is generated as the Q-channel spread signal XQ. A baseband filter 323 filters the I-channel spread signal output from the subtracter 319, and then outputs the filtered I-channel spread signal. A baseband filter 325 filters the Q-channel spread signal output from the adder 321, and then outputs the filtered Q-channel spread signal. A mixer 327 mixes an output of the baseband filter 323 with an I-channel carrier cos($2\pi fct$), and then generates an I-channel RF signal. The mixer 329 mixes an output of the baseband filter 325 with a Q-channel carrier sin($2\pi fct$), and then generates a Q-channel RF signal. The carrier cos($2\pi fct$) is generated from RF channel data output from a controller (not shown). An adder 331 adds the I-channel and Q-channel RF signals output from the mixers 327 and 329, and then generates a transmission RF signal.

As described above, the complex spreader 119 receives data containing I-channel and Q-channel component signals and spread sequences containing the I-channel spread sequence PNI and the Q-channel spread sequence PNQ. The complex spreader 119 spreads the I-channel and Q-channel signals, and then outputs the spread signals.

Figure 4:
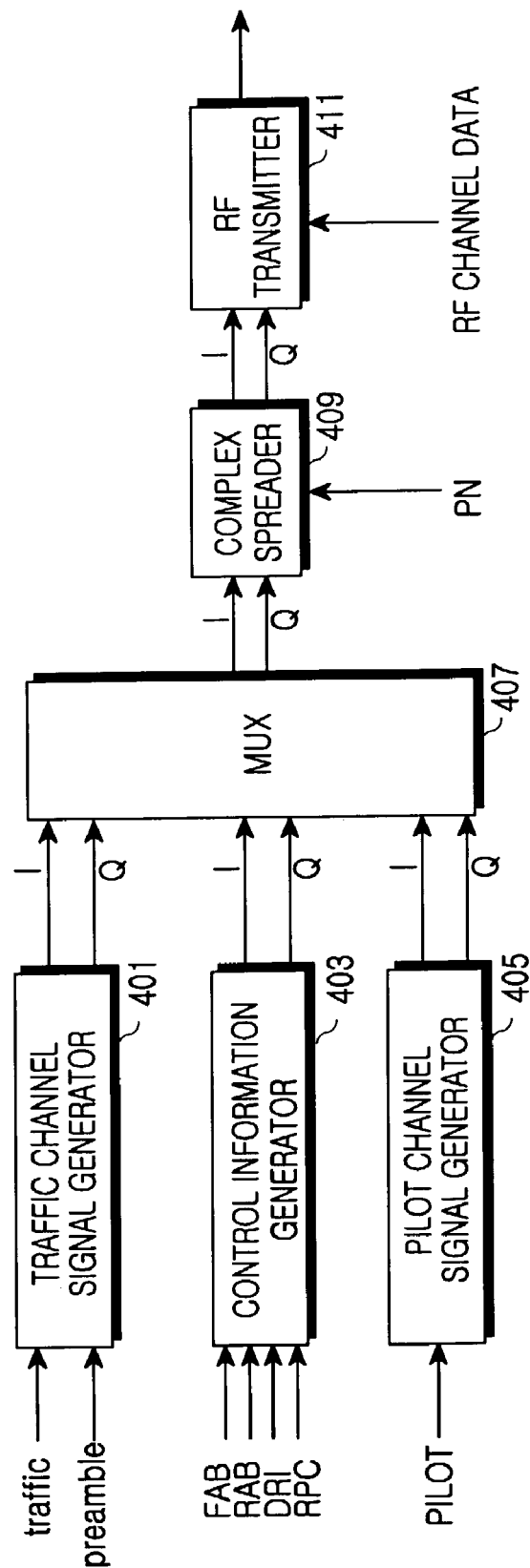
FIG. 4 is a block diagram illustrating an example of a transmission channel base station subsystem provided in the CDMA communication system for providing a data communication service in accordance with an embodiment of the present invention.

FIG. 4 is a block diagram illustrating an example of a transmission channel base station subsystem provided in the CDMA communication system for providing a data communication service in accordance with an embodiment of the present invention. Specifically, FIG. 4 illustrates a channel structure of an EVDO base station subsystem.

Referring to FIG. 4, a traffic channel signal generator 401 orthogonally spreads and multiplexes a traffic signal and a preamble signal. A control information generator 403 orthogonally spreads various control information FAB, RAB, DRI and RPC. A pilot channel signal generator 405 orthogonally spreads a pilot signal. A multiplexer (MUX) 407 multiplexes outputs of the traffic channel signal generator 401, the control information generator 403 and the pilot channel signal generator 405. A complex spreader 409 spreads orthogonal spread signals output from the multiplexer 407 in response to PN sequences. A RF transmitter 411 performs a frequency up-conversion operation for the spread signals with a carrier according to RF channel data, and then outputs a transmission signal.

Figure 5:
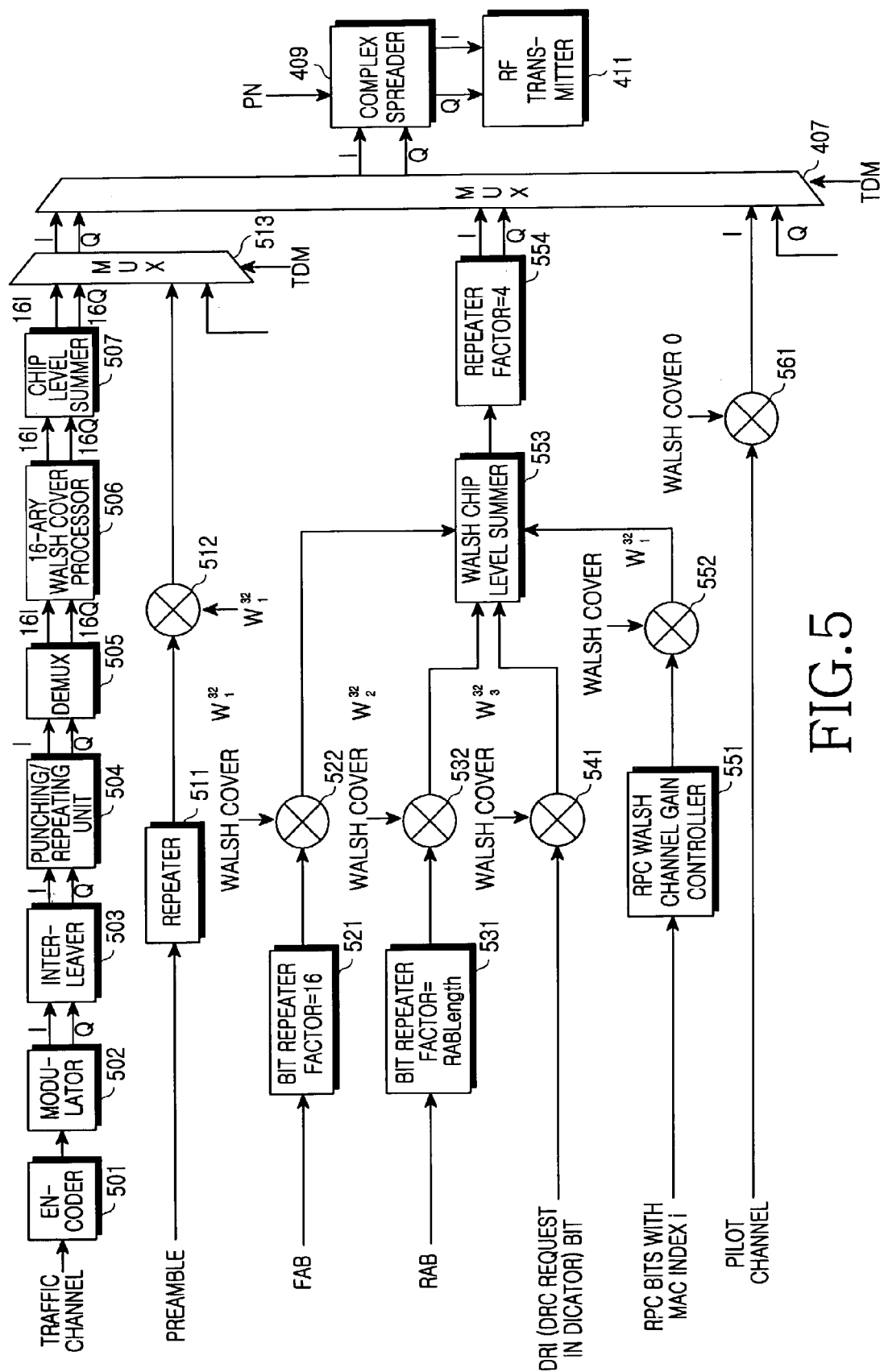
FIG. 5 is a block diagram illustrating an example of a detailed structure of FIG. 4 in accordance with an embodiment of the present invention.

FIG. 5 is a block diagram illustrating an example of a detailed structure of FIG. 4 in accordance with an embodiment of the present invention. Specifically FIG. 5 illustrates a detailed channel structure of the EVDO base station subsystem associated with FIG. 4.

In relation to an operation of the traffic channel signal generator 401, an encoder 501 encodes a received traffic signal, and a modulator 502 modulates the encoded signal using QPSK, 8PSK, 16QAM, etc. according to a data rate. The interleaver 503 performs an interleaving operation for the modulated signal. A punching/repeating unit 504 punches and repeats an interleaved traffic channel signal according to a data rate. A demultiplexer (DEMUX) 505 transmits at or about 16 consecutive bits to at or about 16 parallel channels. A Walsh cover processor 506 multiplies the at or about 16 channels by at or about 16 orthogonal Walsh codes. A Walsh chip level summer 507 performs a summing operation on the basis of a chip level. A preamble repeater 511 repeats a preamble signal according to a data rate. A Walsh spreader 512 spreads the preamble signal with a Walsh code assigned to a reverse power control channel. A multiplexer (MUX) 513 multiplexes the traffic channel and preamble signals by coupling the preamble signal to the traffic channel signal at its preamble section, and then the multiplexed signals are output to the multiplexer 407.

A structure of a transmitter for a data rate control (DRC) request indicator (DRI) bit signal associated with the present invention will now be described in detail. In a forward medium access channel (MAC), a pilot bit signal, a forward activity bit (FAB) signal and a reverse activity bit (RAB) signal are multiplied by Walsh codes of code numbers 0, 1 and 2, respectively. The remaining 29 Walsh codes are multiplied by reverse power control bits for respective users. One of the 29 Walsh codes used for a reverse power control (RPC) bit signal is assigned and used to transmit the DRI bit signal. For example, a Walsh code of a code number 3 is assigned to transmit the DRI bit signal. According to the structure of the transmitter of the base station, the FAB signal is repeated sixteen times by a repeater 521 and multiplied by a Walsh code of a code number 1 through a multiplier 522. The RAB signal is repeated based on an RAB length by a repeater 531, and multiplied by a Walsh code of a code number 2 through a multiplier 532. The DRI bit signal is multiplied by a Walsh code of a code number 3 through a multiplier 541. An RPC channel gain of the RPC bit signal is controlled by an RPC channel gain controller 551, and the remaining Walsh codes are multiplied by the RPC bit signal having the controlled RPC channel gain through a multiplier 552, respectively. Outputs of the multipliers 522, 532, 541 and 552 are summed on the basis of the chip level by a chip level summer 553. A result of the summing from the chip level summer 553 is repeated four times by a MAC channel repeater 554, and half-punched immediately after and before a second pilot burst. As shown in FIG. 3, the multiplexer 407 multiplexes an output of the multiplexer 513 and an output of the MAC channel repeater 554. The complex spreader 503 spreads an output of the multiplexer 407, and the RF transmitter 411 performs a designated RF channel frequency up-conversion operation for the spread signals output from the complex spreader 503, and outputs a transmission signal.

As described above, it can be understood that the channel structure of the base station subsystem for supporting the voice and data communication services is different from that of the base station subsystem for supporting only the data communication service. In the base station subsystems, the complex spreaders 119 and 409 spread transmission signals using the same PN sequences, and the RF transmitters 121 and 411 use the respectively assigned RF channels. Thus, if the mobile station checks a pilot channel signal with changing the frequency channels, the type of base station subsystem can be identified. That is, since 0's or 1's are consecutively repeated in the pilot channel signal, a PN sequence of a base station subsystem can be identified if a channel signal is despread. Thus, if the mobile station checks a pilot channel signal with changing the frequency channels, a type of a base station subsystem can be identified.

Figure 6:
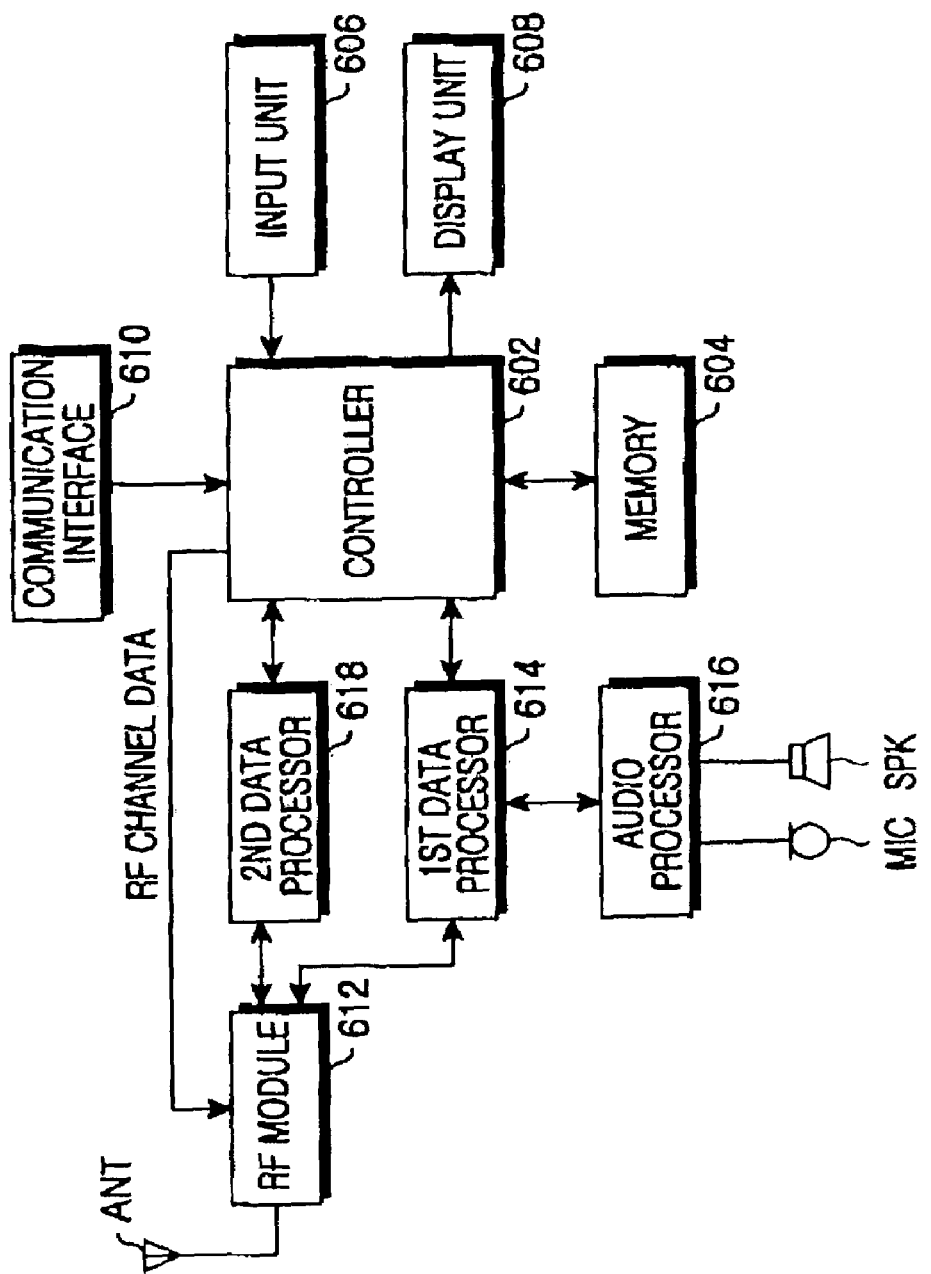
FIG. 6 is a block diagram illustrating an example of the components of a receiver of a mobile station provided in the CDMA communication system in accordance with an embodiment of the present invention.

FIG. 6 is a block diagram illustrating an example of the components of a receiver of a mobile station provided in the CDMA communication system in accordance with an embodiment of the present invention.

Referring to FIG. 6, a controller 602 controls an entire operation of the mobile station. Moreover, the controller 602 generates RF channel control data for setting an RF channel according to a set search mode for a base station subsystem. A memory 604 includes a program memory for storing an operation program of the mobile station and a program for discriminating a type of a base station subsystem in accordance with an embodiment of the present invention, and a data memory for temporarily storing data generated while a program is performed. Moreover, the memory 604 stores various parameters for discriminating between the base station subsystems in accordance with an embodiment of the present invention. The parameters include system identification (SID) and network identification (NID) information, identification information for indicating the type of the base station subsystem, etc. A key input unit 606 includes numeric/character keys for inputting dialing information and character information, function keys for setting various functions and a menu key for setting a menu. Moreover, the key input unit 606 can further include function keys for selecting base station subsystems in accordance with an embodiment of the present invention. A display unit 608 displays an operating state and information of the mobile station under the control of the controller 602. The display unit 608 further includes an indicator for indicating a base station registered in accordance with an embodiment of the present invention. Where the display unit 608 is a color liquid crystal display (LCD), a color of a specified indicator is varied and registered base stations can be indicated. A communication interface 610 is responsible for a communication interface between the mobile station and an external communication device. An RF module 612 sets an RF channel according to RF channel control data output from the controller 602, and transmits and receives an RF signal through the set RF channel. An antenna ANT is connected to the RF module 612.

A first data processor 614 includes a CDMA 1X modem, and demodulates and decodes a signal of a 1X base station subsystem received from the RF module 612. Moreover, the first data processor 614 encodes and modulates a signal to be transmitted to the 1X base station subsystem and then outputs the modulated signal to the RF module 612. The first data processor 614 can include a digital signal processor (DSP). An audio processor 616 processes a voice signal processed in the first data processor 614, and then outputs the processed voice signal to a speaker SPK. Moreover, the audio processor 616 processes a voice signal output from a microphone MIC and then outputs the processed voice signal to the first data processor 614. A second data processor 618 demodulates and decodes an EVDO base station signal output from the RF module 612, and encodes and modulates an EVDO base station signal to be transmitted from the mobile station such that the modulated signal can be output to the RF module 612. The second data processor 618 also can include a digital signal processor (DSP).

Figure 7:
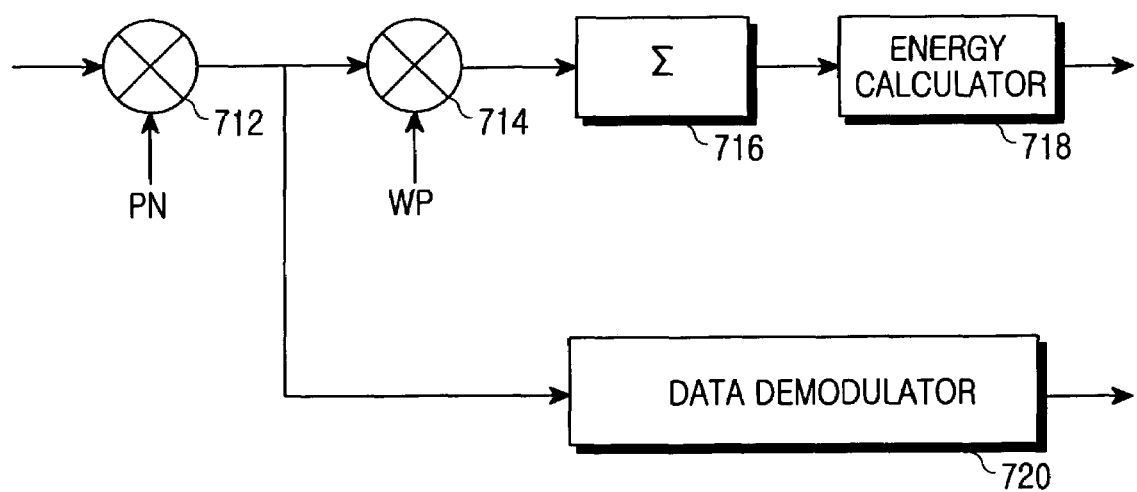
FIG. 7 is a block diagram illustrating an example of a searcher included in a data processor shown in FIG. 5 in accordance with an embodiment of the present invention.

The first data processor 614 and the second data processor 618 include a searcher for receiving a pilot signal and discriminating between types of base station subsystems and fingers for demodulating data, respectively. FIG. 7 is a block diagram illustrating an example of a searcher included in a data processor shown in FIG. 5 in accordance with an embodiment of the present invention.

Referring to FIG. 7, the data processors 614 and 618 include a searcher for detecting a PN sequence from a base station subsystem and performing a channel acquisition operation, and a data demodulator (or finger) 720 for processing a signal transmitted from the base station subsystem, respectively.

An operation of the searcher will now be described. The mobile station despreads received signals, detects signals transmitted from a plurality of base stations using the same RF signals, and measures a reception signal level, a propagation delay, a relative propagation delay between multiple paths, etc. At this time, the parameter to be measured varies according to a target to be accomplished by the mobile station. If the target of the mobile station is to perform location estimation for measuring a distance between the mobile station and a base station, a parameter to be measured by the mobile station is the propagation delay. If the target of the mobile station is to perform finger assignment and a measuring operation for a handoff, the mobile station must measure parameters such as multi-path propagation delay and a signal level.

The searcher of the receiver provided in the mobile station will now be described. A multiplier 712 performs a PN despreading operation by multiplying a frequency down-converted signal received from the RF module 612 by a PN spread code. A multiplier 714 performs orthogonal demodulation by multiplying a PN despread signal output from the multiplier 712 by an orthogonal code Wp assigned to the pilot channel. Accordingly, a signal output from the multiplier 714 becomes a pilot channel signal. An accumulator 716 accumulates outputs of the multiplier 714 in units of symbols, and outputs an accumulation signal. Then, an energy calculator 718 calculates energy of a received pilot signal. A method for calculating the energy of the despread signal is to obtain a sum of the square of an I-channel despread value and the square of a Q-channel despread value, that is, $I^2+Q^2$. The sum corresponds to Ec/Io for a received pilot channel. Here, "Ec"

denotes energy per chip of a received signal, and "Io" denotes power spectral density of a received CDMA signal.

The controller 602 compares an intensity of a pilot channel signal output from the energy calculator 718 with a set reference value, and discriminates between base stations. Then, the controller 602 identifies a corresponding base station using information received through a predetermined channel.

Hereinafter, the CDMA 1X base station subsystem is referred to as a first base station, and the EVDO base station subsystem is referred to as a second base station. Further, the mobile station stores a PRC table as shown in the following Table 1 in a memory 604, and stores identification information of the first and second base stations using parameter information of the PRC table and received base station information.

TABLE 1

| Base station type | SID | NID | Frequency |
| --- | --- | --- | --- |
| 1X | Xxxxxxxxx | mmmmmmmm | fa |
| EVDO | Yyyyyyyy | nnnnnnn | fb |

In TABLE 1, SID information, NID information and RF channel control data according to the base station type are stored.

Figure 8A:
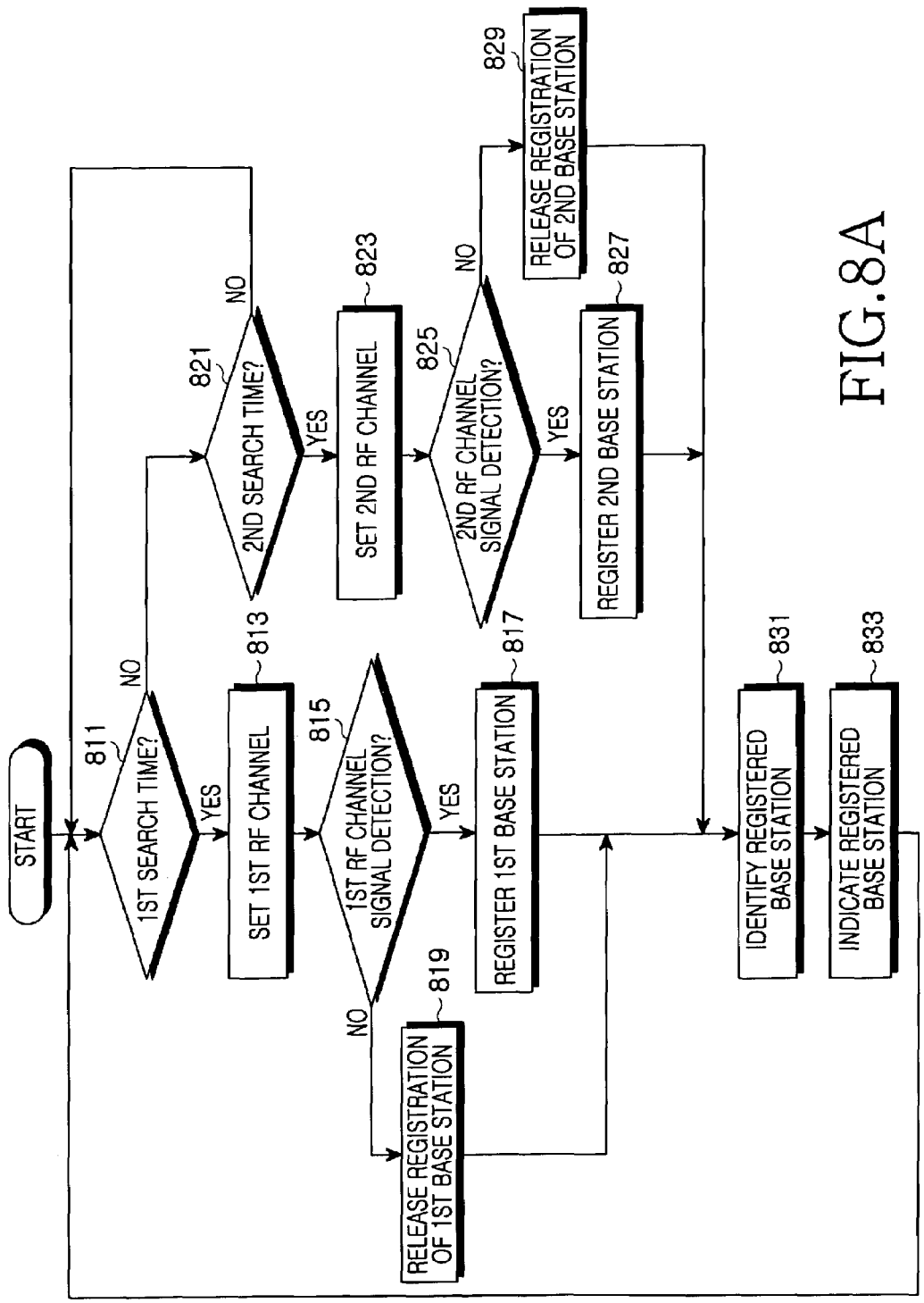
FIGS. 8A and 8B together are diagrams illustrating an example of steps for discriminating between base station subsystems in a mobile station in accordance with an embodiment of the present invention.
Figure 8B:
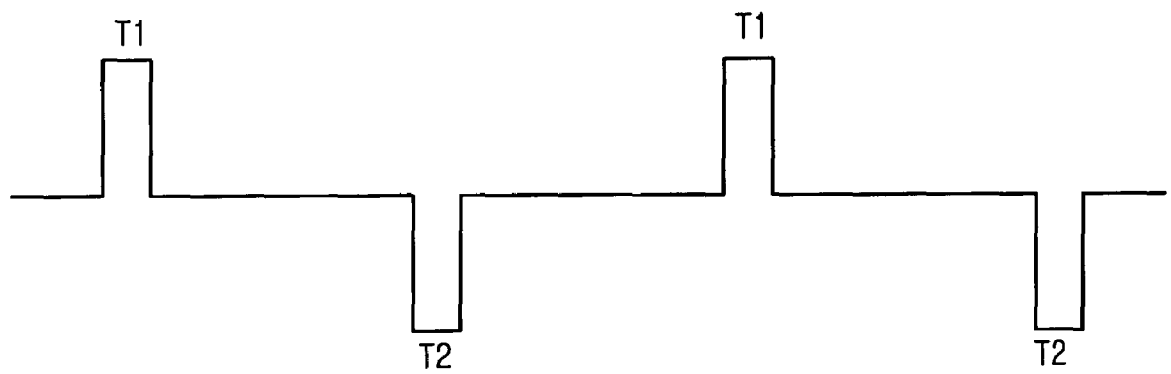

FIG. 8A is a flow chart illustrating an example of steps for discriminating between base station subsystems in accordance with an embodiment of the present invention; and FIG. 8B illustrates an example of a timing signal for searching for the first and second base stations in accordance with an embodiment of the present invention.

Referring to FIG. 8B, the controller 602 of the mobile station sets RF channels of the first and second base stations in a first search time T1 and a second search time T2 repeated at a predetermined time-interval, and searches the base stations in a hybrid search manner. As shown in FIG. 8B, it is assumed that the first search time T1 and the second search time T2 are alternately generated.

Referring to FIG. 8A, the controller 602 generates the first search time T1 and the second search time T2 at a predetermined time-interval. At this time, at the first search time T1, the controller 602 detects the first search time T1 at step 811, and outputs RF channel control data of the first base station at step 813. If so, the RF module 612 generates an RF signal corresponding to the first RF channel control data of the first base station, and down-converts a frequency of a received RF signal. Then, a searcher of the first data processor 614 searches for a pilot channel signal of the first RF channel, and then outputs information of the energy of the searched pilot channel to the controller 602. At step 815, the controller 602 determines whether the searched pilot signal of the first base station is detected. If the energy of the searched pilot channel is larger than a predetermined reference value, it is determined that the pilot signal of the first base station has been detected. At step 817, the controller 602 registers the first base station in the memory 604. Then, the controller 602 receives a signal of a specified channel (e.g., a synchronous channel in the case of a 1X base station) of the first base station, and stores identification information of the first base station in the memory 604. The identification information includes SID information and NID information associated with the first base station, etc. However, if the pilot signal of the first base station is not detected at step 815, the controller 602 releases the registration of the first base station stored in the memory 604 at step 819.

Moreover, at the second search time T2, the controller 602 detects the second search time T2 at step 821, and outputs RF channel control data of the second base station at step 823. If so, the RF module 612 generates an RF signal corresponding to the second RF channel control data of the second base station, and down-converts a frequency of a received RF signal. Then, a searcher searches for a pilot channel signal of the second RF channel, and then outputs information of the energy of the searched pilot channel to the controller 602. Here, the searcher can be included in the first data processor 614 or the second data processor 618. At step 825, the controller 602 determines whether the searched pilot signal of the second base station is detected. If the energy of the searched pilot channel is larger than a predetermined reference value, it is determined that the pilot signal of the second base station has been detected. At step 827, the controller 602 registers the second base station in the memory 604. Then, the controller 602 receives a signal of a specified channel of the second base station, and identifies and stores identification information of the second base station in the memory 604. At this time, the identification information includes SID information and NID information associated with the second base station, etc. However, if the pilot signal of the second base station is not detected at the above step 825, the controller 602 releases the registration of the second base station stored in the memory 604 at step 829.

Then, the controller 602 identifies base stations registered at step 831. Four types of registrations can exist. That is, cases exists where the first and second base stations are registered, only the first base station is registered, only the second base station is registered, and where neither the first nor second base stations are registered. The controller 602 allows the display unit 608 to indicate registration states of the first and second base stations at step 833.

Figure 11A:
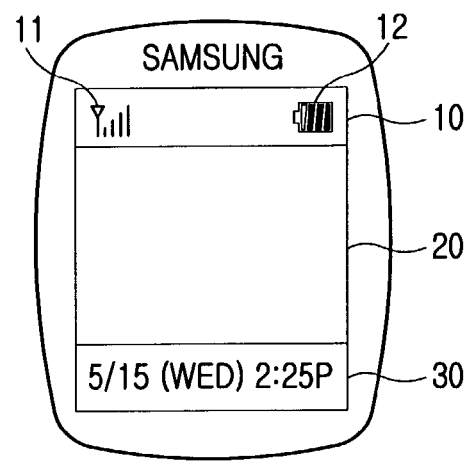
FIGS. 11A and 11B are block diagrams illustrating examples for indicating communication states of a plurality of base station subsystems in accordance with an embodiment of the present invention.
Figure 11B:
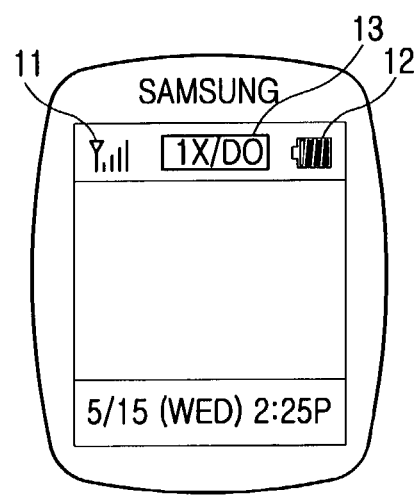

FIGS. 11A and 11B are block diagrams illustrating examples for indicating communication states of a plurality of base station subsystems in accordance with an embodiment of the present invention. As shown in FIGS. 11A and 11B, the display unit 608 includes a first display area 10 for indicating a current state of the mobile station, a second display area 20 for displaying character and image data, a third display area 30 for displaying time information, etc. However, the display unit 608 can display information in another form, if necessary, without classifying the first, second and third display areas 10, 20 and 30. The first display area of the display unit 608 includes an indicator 11 for indicating reception sensitivity of the mobile station, and an indicator 12 for indicating a remaining amount of a battery of the mobile station. Moreover, as shown in FIG. 11B, the display unit 608 can further include an indicator 13 for indicating a communication state with a plurality of base stations. That is, it is assumed that the first display area further includes an indicator for indicating types of base stations in accordance with an embodiment of the present invention.

To indicate the base station types, the display unit 608 indicates "1X/DO". If a corresponding base station has been identified, "1X" or "DO" can be indicated. That is, if the mobile station can communicate with the CDMA 1X base station subsystem, the indicator 13 indicates "1X". Otherwise, if the mobile station can communicate with the EVDO base station subsystem, the indicator 13 indicates "DO". Otherwise, if the mobile station can communicate with the CDMA 1X base station subsystem and the EVDO base station subsystem, the indicator 13 indicates both "1X" and "DO". Where the display unit 608 is a color LCD, the communication states can be represented by colors. That is, where the display unit 608 is the color LCD without a separate indicator for indicating the base station subsystems as shown in FIG. 11A, the display unit 608 can indicate the base station subsystems with a reception sensitivity indicator 11. If the mobile station can communicate with only the CDMA 1X base station subsystem, the indicator 11 is displayed by a black color. Otherwise, if the mobile station can communicate with only the CDMA 1X EVDO base station subsystem, the indicator 11 is displayed by a red color. Otherwise, if the mobile station can communicate with the CDMA 1X base station subsystem and the CDMA 1X EVDO base station subsystem, the indicator 11 is displayed by a blue color. Further, when the pilot signals of the first and second base stations are detected at steps 815 and 825, the controller 602 informs the user of the registration of a corresponding base station using an audio or vibration signal through the audio processor 616, if the base stations are registered in a state that the registrations of the base stations are released, at steps 817 and 827. The controller 602 controls the display unit 608 such that the registered base stations are indicated on the display area 20 by characters.

After the registered base stations are indicated, the controller 602 returns to step 811 and repeats the above-described procedure.

Figure 9:
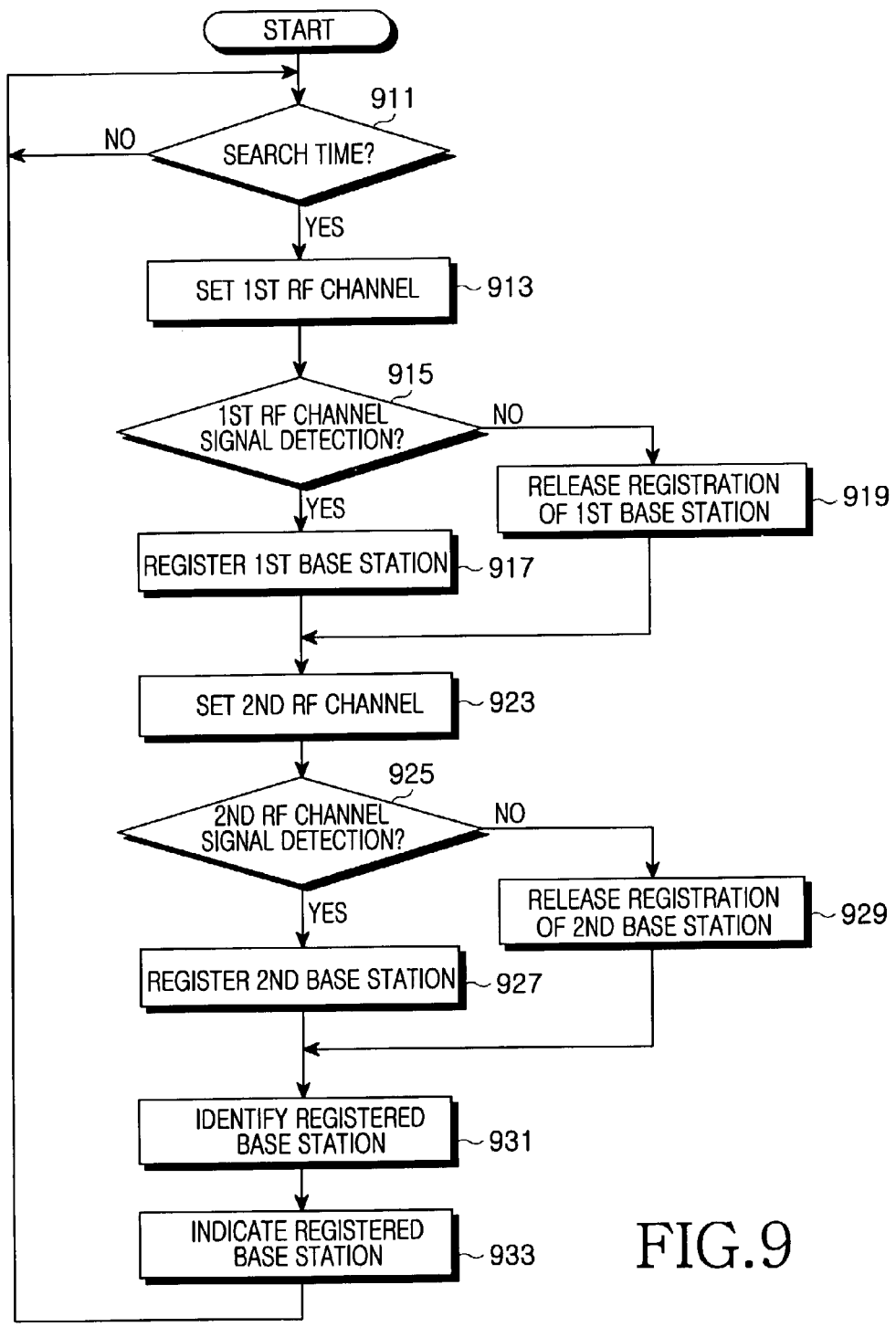
FIG. 9 is a flow chart illustrating an example of steps for discriminating between the base station subsystems in the mobile station in accordance with an embodiment of the present invention.

FIG. 8A shows a method of alternately searching the first and second base stations at a predetermined time-interval as shown in FIG. 8B. However, when searching, a method for consecutively searching the first base station and the second base station can be used. FIG. 9 is a flow chart illustrating an example of steps for discriminating between the base station subsystems in the mobile station in accordance with an embodiment of the present invention. Specifically, FIG. 9 is illustrates an example of steps for consecutively searching the first base station and the second base station.

Referring to FIG. 9, when searching, the controller 602 detects the search at step 911, performs steps 913 to 919, sets an RF channel of the first base station, searches the first base station, and registers the searched base station. Then, the controller performs steps 923 to 929, sets an RF channel of the second base station, searches the second base station, and registers the searched base station. Then, after steps 931 to 933, the types of the registered base stations are indicated as described above with respect to FIG. 8.

Figure 10:
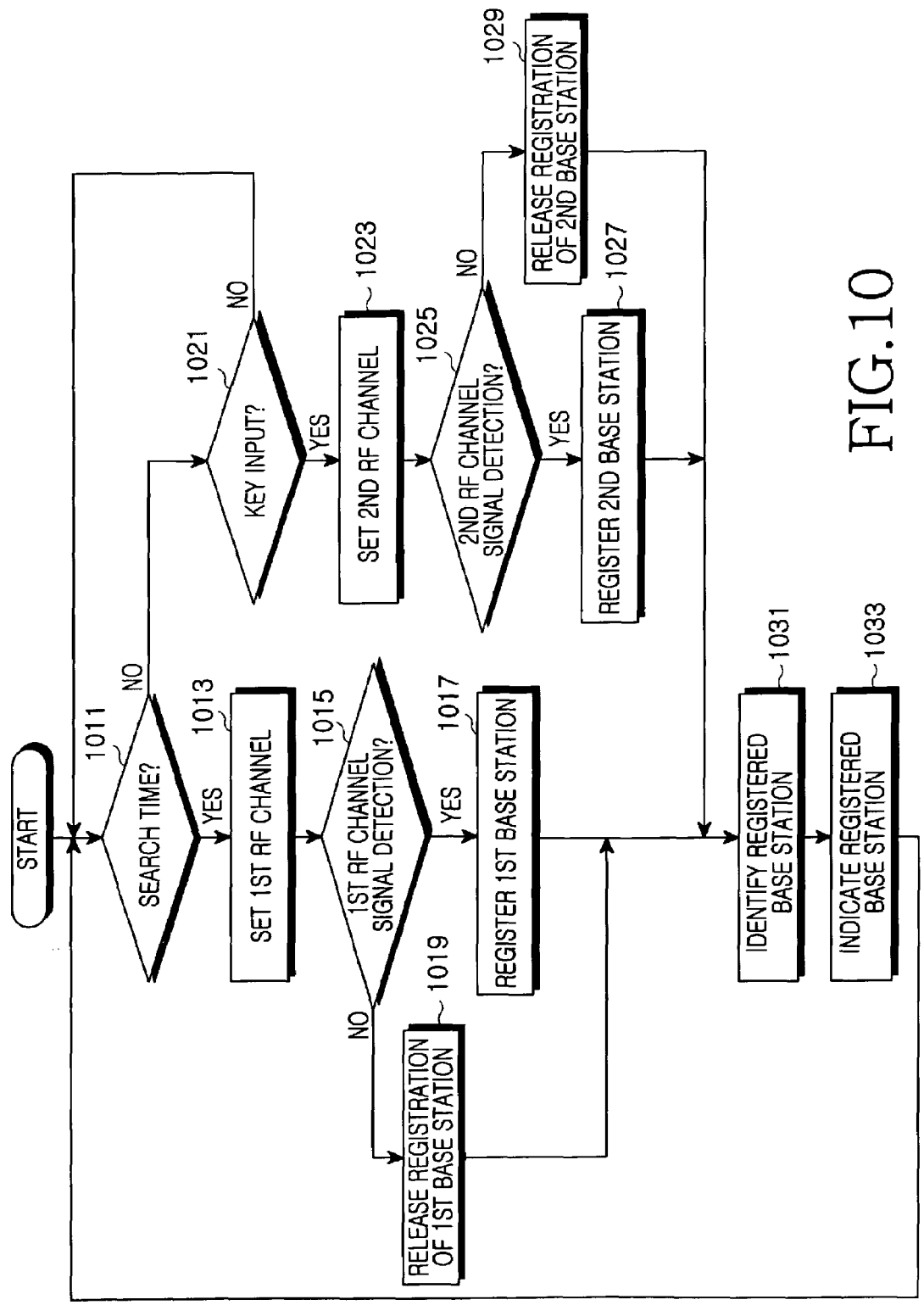
FIG. 10 is a flow chart illustrating a an example of steps for discriminating between the base station subsystems in the mobile station in accordance with an embodiment of the present invention.

Typically, the major purpose of the mobile station is to perform communications. The mobile station performs voice communications more frequently than data communications. Here, the data communications can be a packet data service, an image data service, etc. When the mobile station searches the second base station less frequently than the first base station, the life of the mobile station's battery can be prolonged. FIG. 10 is a flow chart illustrating an example of steps for discriminating between the base station subsystems in the mobile station in accordance with an embodiment of the present invention. Specifically, FIG. 10 illustrates an example of steps for searching the second base station in a state that the mobile station switches an operating mode to a communication mode.

Referring to FIG. 10, when searching, the controller 602 detects the search time, performs steps 1013 to 1019, sets an RF channel of the first base station, searches the first base station, and registers the searched base station. When not searching, the controller 602 determines whether a key is inputted at step 1021. The key input state refers to a state that a flip or folder is in e.g., an on state (an open state). The key input can be a call connection key input, an Internet connection key input, etc. If the key input is generated, the controller 602 performs steps 1023 to 1029, sets an RF channel of the second base station, searches the second base station, and registers the searched base station. Then, after steps 1031 to 1033, the types of the registered base stations are indicated as described above.

In FIGS. 8A to 10, there is considered the case where two base station types can be discriminated. However, more than two base station types can be discriminated between in accordance with an embodiment of the present invention. Further, it is assumed that the first base station is used for voice and data communication services, and the second base station is used for only a data communication service. However, the first and second base stations can be associated with different networks for providing the voice and data communication services (or only the data communication service).

Moreover, it is assumed that types of base station are discriminated between using different RF channels. However, the types of base station can be discriminated between using identification information of different base stations. That is, the base stations provided in the CDMA communication system use different codes (including a PN sequence of the North American CDMA system). A searcher for searching for a pilot channel signal detects a PN sequence, and a type of a base station can be identified through the detected PN sequence. That is, a mobile station can search for a code of a corresponding base station type from pilot channel signals using different codes on a base station type basis other than RF channels, thereby discriminating the type of the base station.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A receiver provided in a mobile station communicating with at least two different types of base stations, the at least two different types of base stations using the same spread code sequences and different channel frequency, comprising:

a radio frequency (RF) module for setting reception RF bands for the respective base stations in response to the generated frequency channel control data, and down-converting signals received in the set reception RF bands;

a searcher for carrying out a pseudo-noise (PN) despreading operation for signals outputted from the RF signal, despreading the PN-despread signal to an orthogonal signal of a pilot channel and measuring intensities of the orthogonally despread pilot signal, and outputting a result of the measurement to the controller;

a controller for sequentially setting a search time for the base stations at base station search times, outputting frequency channel control data for each corresponding base station at the set search time to the RF module, analyzing intensities of the pilot channel signals received from the base stations of the set frequency channels, and registering the base stations; and a display unit for indicating the base stations registered by the controller, wherein the display unit varies a color of a specified indicator arranged on a display area to a color of a predetermined base station and indicates at least one registered base station.

2. The receiver as set forth in claim 1, wherein the searcher comprises:

a pseudo noise (PN) despreader for carrying out a PN despreading operation for the received signal;

an orthogonal despreader for despreading the PN-despread received signal to an orthogonal signal of a pilot channel; and an energy calculator for measuring an energy of the orthogonally despread pilot channel signal, and outputting a result of the measurement to the controller.

3. The receiver as set forth in claim 1, wherein the indicator indicates reception sensitivity.

4. The receiver as set forth in claim 1, wherein the display unit indicates at least one registered base station by characters.

5. The receiver as set forth in claim 1, further comprising:
an audio processor for giving notification of a base station registered under control of the controller through an audio signal.

6. A receiver provided in a mobile station of a code division multiple access (CDMA) communication system communicating with a first base station used for voice and data communication services and a second base station used for a data communication service, the first and second base stations using the same spread code sequences and different channel frequency, comprising:

a radio frequency (RF) module for setting reception RF bands for receiving signals of the first and second base stations in response to the generated frequency channel control data, and down-converting signals received in the set reception RF bands;

a first data processor for processing a channel signal of the first base station outputted from the RF module, measuring an intensity of a received signal of a pilot channel of the first base station outputted from the RF module, and outputting a result of the measurement to the controller;

a second data processor for processing a channel signal of the second base station outputted from the RF module, measuring an intensity of a received signal of a pilot channel of the second base station outputted from the RF module, and outputting a result of the measurement to the controller;

a controller for generating frequency channel control data assigned to the first base station at a first search time, to output the generated frequency channel control data to the RF module, generating frequency channel control data assigned to the second base station at a second search time, to output the generated frequency channel control data to the RF module, analyzing signals of the pilot channels received from the base stations through respectively set frequency channels, and registering the base stations; and a display unit for indicating the first base station and/or the second base station registered by the controller, wherein the display unit comprises a color liquid crystal display (LCD) which varies a color of a specified indicator arranged on a display area, indicates a registered base station by a first color when the first base station is registered, indicates a registered base station by a second color when the second base station is registered, and indicates registered base stations by a third color when the first and second base stations are registered.

7. The receiver as set forth in claim 6, wherein the searcher comprises:
a pseudo noise (PN) despreader for carrying out a PN despreading operation for the received signal;
an orthogonal despreader for despreading the PN-despread received signal to an orthogonal signal of a pilot channel; and an energy calculator for measuring energy of the orthogonally despread pilot channel signal, and outputting a result of the measurement to the controller.

8. The receiver as set forth in claim 6, wherein the controller alternately sets the first and second search times for the base stations at a predetermined time-interval, and outputs frequency channel control data for the base station corresponding to the set search time.

9. The receiver as set forth in claim 6, wherein the indicator indicates reception sensitivity.

10. The receiver as set forth in claim 6, wherein the display unit indicates at least one registered base station by characters.

11. The receiver as set forth in claim 6, further comprising:
an audio processor for giving notification of the base station registered under control of the controller through an audio signal.

12. The receiver as set forth in claim 6, wherein the display unit further comprises indicators for indicating registration states of the first and second base stations on a display area, and displays an indicator corresponding to a registered base station.

13. A method for identifying base stations in a mobile station of a code division multiple access (CDMA) communication system communicating with a first base station used for voice and data communication services and a second base station used for a data communication service, in which the first and second base stations uses the same spread code sequence and different channel frequencies, and a first search time and a second search time are alternatively generated, comprising the steps of:

outputting first frequency channel control data for selecting a first frequency channel of the first base station at the first search time, measuring an intensity of a signal received from the first frequency channel, and determining registration of the first base station;

outputting second frequency channel control data for selecting a second frequency channel of the second base station at a second search time after a predetermined time elapses from the first search time, measuring a signal received from the selected second frequency channel, and determining registration of the second base station; and indicating the registration of the first base station and/or the registration of the second base station in response to results of the determinations, wherein said step of said indicating comprises varying a color of a specified indicator arranged on a display area to a color of a predetermined base station and indicating at least one registered base station.

14. A method for identifying base stations in a mobile station of a code division multiple access (CDMA) communication system communicating with a first base station used for voice and data communication services and a second base station used for a data communication service, in which the first and second base stations use the same spread code sequences and different channel frequencies, and a search time is generated at a predetermined time-interval, comprising the steps of:

outputting first frequency channel control data for selecting a first frequency channel of the first base station at the search time, measuring an intensity of a signal received from the selected first frequency channel, and determining registration of the first base station and subsequently outputting second frequency channel control data for selecting a second frequency channel of the second base station, measuring a signal received from the selected second frequency channel, and determining registration of the second base station; and indicating the registration of the first base station and/or the registration of the second base station in response to results of the determinations, wherein said step of said indicating comprises varying a color of a specified indicator arranged on a display area to a color of a predetermined base station and indicating at least one registered base station.

15. A method for identifying base stations in a mobile station of a code division multiple access (CDMA) communication system communicating with a first base station used for voice and data communication services and a second base station used for a data communication service, the first and second base stations using the same spread code sequences and different channel frequency, comprising the steps of:

outputting first frequency channel control data for selecting a first frequency channel of the first base station at each search time, measuring an intensity of a signal received from the selected first frequency channel, and determining registration of the first base station;

outputting second frequency channel control data for selecting a second frequency channel of the second base station at a communication mode, measuring an intensity of a signal received from the selected second frequency channel, and determining registration of the second base station; and indicating the registration of the first base station and/or the registration of the second base station in response to results of the determinations, wherein said step of said indicating comprises varying a color of a specified indicator arranged on a display area to a color of a predetermined base station and indicating at least one registered base station.

* * * * *